(12) United States Patent
Moradi et al.

(10) Patent No.: US 12,392,882 B1
(45) Date of Patent: Aug. 19, 2025

(54) RADAR SYSTEM WITH MACHINE LEARNING ENHANCED ANTENNA ARRAY

(71) Applicant: MURATA MANUFACTURING CO., LTD., Nagaokakyo (JP)

(72) Inventors: Hassan Daniel Moradi, San Diego, CA (US); Ashish Basireddy, San Diego, CA (US)

(73) Assignee: Murata Manufacturing Co. Ltd., Kyoto (JP)

( * ) Notice: Subject to any disclaimer, the term of this patent is extended or adjusted under 35 U.S.C. 154(b) by 0 days.

(21) Appl. No.: 18/891,432

(22) Filed: Sep. 20, 2024

Related U.S. Application Data

(60) Provisional application No. 63/556,002, filed on Feb. 21, 2024.

(51) Int. Cl.
*G01S 13/06* (2006.01)
*G01S 7/03* (2006.01)

(52) U.S. Cl.
CPC ............... *G01S 13/06* (2013.01); *G01S 7/03* (2013.01)

(58) Field of Classification Search
CPC ...... H04B 7/0413; H01Q 21/00; H01Q 21/06; H01Q 21/061; H01Q 21/08; G01S 7/03; G01S 13/06
See application file for complete search history.

(56) References Cited

U.S. PATENT DOCUMENTS

| | | | | |
|---|---|---|---|---|
| 10,564,277 B2 * | 2/2020 | Hong | ............. | G01S 13/003 |
| 11,280,879 B2 * | 3/2022 | Hong | ............. | G01S 13/343 |
| 11,997,455 B2 * | 5/2024 | Cnaan | ............. | H01Q 21/061 |
| 12,099,110 B2 * | 9/2024 | Achatz | ............. | G01S 7/354 |
| 12,140,696 B2 * | 11/2024 | Chen | ............. | G01S 7/417 |
| 2015/0048970 A1 | 2/2015 | Schoor | | |
| 2017/0322295 A1 | 11/2017 | Loesch et al. | | |
| 2019/0212438 A1 | 7/2019 | Kim | | |
| 2019/0219670 A1 | 7/2019 | Culkin et al. | | |
| 2019/0324136 A1 * | 10/2019 | Amadjikpe | ............. | G01S 13/70 |
| 2020/0025906 A1 * | 1/2020 | Kesaraju | ............. | G01S 13/931 |
| 2020/0096626 A1 | 3/2020 | Wang et al. | | |
| 2020/0256972 A1 * | 8/2020 | Eckert | ............. | G01S 13/86 |
| 2020/0333457 A1 * | 10/2020 | Bialer | ............. | G01S 7/352 |
| 2021/0296783 A1 * | 9/2021 | Rostomyan | ............. | H01Q 1/2283 |

(Continued)

OTHER PUBLICATIONS

International Search Report and Written Opinion for PCT/US2025/014370, mailing date May 1, 2025, 16 pages.

*Primary Examiner* — Peter M Bythrow
(74) *Attorney, Agent, or Firm* — FisherBroyles, LLP

(57) ABSTRACT

A radar system comprises a physical antenna array comprising a plurality of physical transmit antennas that each transmit a respective transmit signal at a wavelength $\lambda$ and a plurality of physical receive antennas, each arranged to receive each of the respective transmit signals. The physical antenna array further comprises processor coupled to the physical antenna array and arranged to generate data corresponding to a virtual antenna array having a defined distance between each virtual antenna that is inconsistent and to generate data, via a neural network, corresponding to one or more supplemental virtual antennas that when used in conjunction with the data corresponding to the virtual antenna array represents data for a supplemented antenna array having a defined distance between each antenna of $\lambda/2$.

20 Claims, 8 Drawing Sheets

(56) References Cited

U.S. PATENT DOCUMENTS

| | | | |
|---|---|---|---|
| 2021/0311180 A1* | 10/2021 | Wang | G01S 13/538 |
| 2021/0377657 A1* | 12/2021 | Cnaan | A61B 5/4815 |
| 2022/0196798 A1* | 6/2022 | Chen | G01S 7/354 |
| 2022/0196821 A1 | 6/2022 | Amadjikpe et al. | |
| 2022/0214425 A1* | 7/2022 | Yoffe | G01S 13/584 |
| 2022/0283286 A1* | 9/2022 | Wu | G01S 13/931 |
| 2022/0308166 A1* | 9/2022 | Orr | G01S 7/417 |
| 2023/0269024 A1* | 8/2023 | Lee | H04L 1/0003 |
| | | | 714/750 |
| 2023/0280455 A1* | 9/2023 | Jo | G01S 7/028 |
| | | | 342/25 R |
| 2023/0318662 A1* | 10/2023 | Jeon | H04B 7/0413 |
| 2024/0142605 A1* | 5/2024 | Jeon | G01S 13/931 |
| 2024/0192350 A1* | 6/2024 | Khang | G01S 13/931 |
| 2024/0302489 A1* | 9/2024 | Liu | H01Q 21/0006 |

\* cited by examiner

RADAR SYSTEM WITH MACHINE LEARNING ENHANCED ANTENNA ARRAY

CROSS REFERENCES TO RELATED APPLICATIONS

This application claims priority to U.S. Provisional Patent Application Ser. No. 63/556,002, for "RADAR SYSTEM WITH MACHINE LEARNING-ENHANCED ANTENNA ARRAY" filed Feb. 21, 2024, which is hereby incorporated by reference in its entirety for all purposes.

FIELD

The described embodiments relate generally to radar systems, such as arrays that employ one or more transmitters and one or more receivers. More particularly, the present embodiments relate to multiple input and multiple output (MIMO) radar systems.

BACKGROUND OF THE INVENTION

Radar provides the ability to detect objects in challenging scenarios (e.g., snow, rain, low or no lighting, etc.). Radar can be used to provide range, speed, and angle information for objects and can have myriad uses including collision avoidance (e.g., for a vehicle) and target detection (e.g., detection of a drone from a ground-based station). Vehicular-based radar systems may have many uses including parking assist, blind spot monitoring, lane change assist, automatic cruise control and automatic emergency braking.

One type of radar system that employs multiple transmitters and receivers, also called a multiple input, multiple output (MIMO) radar configuration, can be used to determine angular information for an object so it can be positioned in space relative to the antennas. With traditional radar systems, the angular resolution of a radar system is directly linked to the quantity of antennas used, in line with the Nyquist-Shannon limitation. Thus, to improve the angular resolution of such radar systems the number of antennas needs to be increased which commensurately increases the system cost, weight, and complexity.

Some MIMO radar systems employ methods to create virtual antenna arrays such that a given MIMO radar system having a fixed number of physical antennas can have improved angular resolution. For example, if a MIMO radar system has 3 "physical" transmit antennas and 4 "physical" receive antennas, a 12-element "virtual" antenna array can be created where the virtual antennas are generated via digital signal processing of the received signals. However, if one or more of the physical antennas do not have consistent $\lambda/2$ spacing between adjacent antennas, the 12-element virtual antenna may have "gaps" (e.g., a spacing larger $\lambda/2$) that result in the array having non-uniform phase which is detrimental to angle processing. New radar systems are needed that can provide uniform phase for physical antenna arrays having one or more spaces between adjacent antennas that are not $\lambda/2$.

SUMMARY OF THE INVENTION

In some embodiments a radar system comprises a physical antenna array comprising a plurality of physical transmit antennas that each transmit a respective transmit signal of wavelength $\lambda$ and a plurality of physical receive antennas, each arranged to receive all the transmit signals. The physical antenna array system further comprises of a processor coupled to the physical antenna array and designed to generate data corresponding to a virtual antenna array having a defined distance between each virtual antenna that is inconsistent or non-linear in phase. The processor further generates data, via a neural network, corresponding to one or more supplemental virtual antennas that when used in conjunction with the data corresponding to the virtual antenna array represents data for a supplemented antenna array having a defined distance between each antenna of $\lambda/2$. With the help of signal processing and Machine learning techniques, this inconsistent data from one or more virtual antenna array elements is used to generate data corresponding to a supplemental virtual antenna array having a defined distance between each antenna of $\lambda/2$. In some embodiments the first physical receive antenna of the plurality of physical receive antennas is spaced apart from a second physical receive antenna of the plurality of physical receive antennas by a distance greater than $\lambda/2$.

In various embodiments the first physical transmit antenna of the plurality of physical transmit antennas is spaced apart from a second physical transmit antenna of the plurality of physical transmit antennas by a distance greater than $\lambda/2$. In some embodiments a first defined distance between a first virtual antenna and a second virtual antenna of the virtual antenna array is an integer multiple of $\lambda/2$. In such embodiments the generated data corresponding to one of the one or more supplemental virtual antennas corresponds to supplemental virtual antenna positioned between the first virtual antenna and the second virtual antenna of the virtual antenna array. In some embodiments a neural network trained via machine learning, are employed for such tasks. In various embodiments the virtual antenna array has a number of virtual antennas equal to a product of a number of the plurality of physical transmit antennas and a number of the plurality of physical receive antennas.

In some embodiments a radar system comprises a physical antenna array comprising a plurality of physical transmit antennas that each transmit a respective transmit signal at a wavelength $\lambda$ and a plurality of physical receive antennas, each arranged to receive all transmit signals. The physical antenna array system further comprises a processor coupled to the physical antenna array and arranged to generate data corresponding to a virtual antenna array using data from the physical antenna array, and to generate data corresponding to one or more supplemental virtual antennas using a neural network. The processor calculates angular information for of an object using the generated data corresponding to the virtual antenna array and the generated data corresponding to the one or more supplemental virtual antennas. In various embodiments the data for the virtual antenna array includes data from a plurality of virtual antennas, and wherein a defined distance between each virtual antenna is inconsistent.

In some embodiments the first physical receive antenna of the plurality of physical receive antennas is spaced apart from a second physical receive antenna of the plurality of physical receive antennas by a distance greater than $\lambda/2$. In various embodiments the first physical transmit antenna of the plurality of physical transmit antennas is spaced apart from a second physical transmit antenna of the plurality of physical transmit antennas by a distance greater than $\lambda/2$. In some embodiments a first defined distance between a first virtual antenna and a second virtual antenna of the virtual antenna array is an integer multiple of $\lambda/2$. In various embodiments the data generated for one of the one or more supplemental virtual antennas is for a supplemental virtual antenna positioned between the first and the second virtual antennas of the virtual antenna array. In some embodiments the neural network is trained via machine learning. In various embodiments the virtual antenna array has a number of virtual antennas equal to a product of a number of the plurality of physical transmit antennas and a number of the plurality of physical receive antennas.

In some embodiments a method of operating a radar system comprises generating data for a virtual antenna array using data received from a physical antenna array, wherein the physical antenna array comprises a plurality of physical transmit antennas that each transmit a respective transmit signal at a wavelength $\lambda$, and a plurality of physical receive antennas, each arranged to receive each of the respective the transmit signals. The radar system further generates data, using a neural network, for one or more supplemental virtual antennas and calculates angular information for an object using the generated data for the virtual antenna array and the generated data for the one or more supplemental virtual antennas.

In various embodiments the data for the virtual antenna array includes data from a plurality of virtual antennas, and wherein a defined distance between each virtual antenna is inconsistent. In some embodiments a first physical receive antenna of the plurality of physical receive antennas is spaced apart from a second physical receive antenna of the plurality of physical receive antennas by a distance greater than $\lambda/2$. In various embodiments a first physical transmit antenna of the plurality of physical transmit antennas is spaced apart from a second physical transmit antenna of the plurality of physical transmit antennas by a distance greater than $\lambda/2$. In some embodiments the neural network is trained via machine learning.

DETAILED DESCRIPTION

A multiple input multiple output (MIMO) radar configuration employs multiple physical transmit antennas and receive antennas that are used to generate a virtual antenna array which can be used to calculate angular information for an object. However, if each of the physical antennas does not have "$\lambda/2$-based spacing" between adjacent antennas, the resulting virtual array will have gaps causing non-uniform phase that either prevents angular calculations from being performed or degrades the resolution of the angular calculations. The present invention uses a neural network to supplement the data generated by physical antennas, providing a virtual array with uniform phase so the angular calculations can be performed with the requisite resolution.

The present invention uses data from the physical transmit and receive antennas to generate a virtual antenna array, however because one or more of the physical transmit and/or receive antennas does not have "$\lambda/2$-based spacing" the resulting virtual antenna array has one or more gaps (e.g., one or more spaces between virtual antennas that are integer multiples of $\lambda/2$ where the integer is greater than 1). More specifically, "$\lambda/2$-based spacing" of the physical antennas is when the direct generation of a virtual antenna array from the physical antennas results in consistent $\lambda/2$ spacing between each virtual antenna. This embodiment employs a neural network to generate data for one or more supplemental antennas that are used to "fill in" the one or more gaps so the resulting supplemental virtual antenna array has a consistent $\lambda/2$ spacing, and uniform phase. The system uses data from both the virtual antenna array and from the neural network (e.g., the one or more supplemental antennas) to calculate angular information for the radar system.

The neural network can be trained via machine learning with data from the physical and/or virtual antennas to fill in the gaps that cause phase discontinuity, providing an antenna array with improved and/or uniform angular resolution. Thus, conventional radar systems that do not have "$\lambda/2$-based spacing" of one or more physical antennas can have improved angular resolution with minimal increased system cost, weight, or complexity. These and other embodiments will be described in more detail below.

Figure 1A:
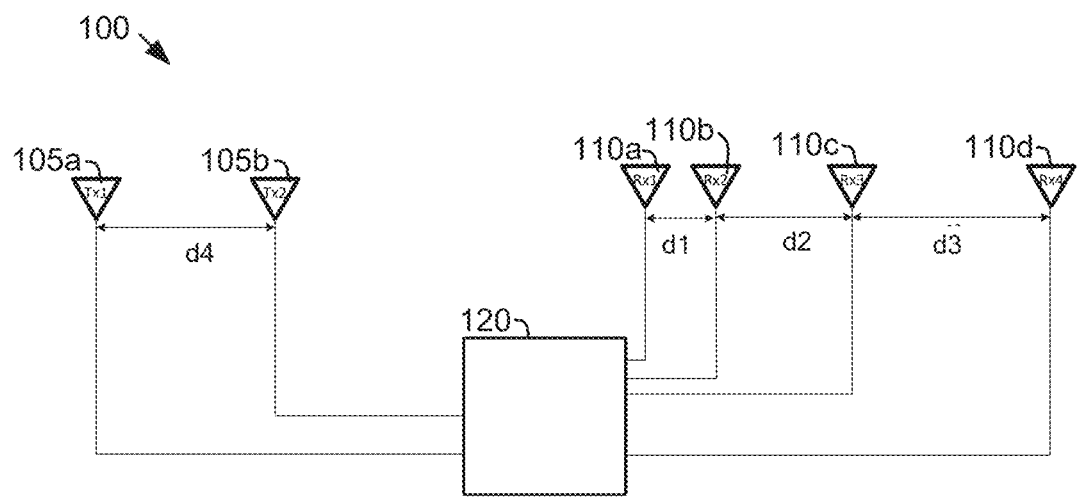
FIG. 1A is a simplified diagram of a radar system with non-standard (sparse, uniform or non-uniform) spacing between physical antenna elements, according to some aspects of the present disclosure.

FIG. 1A illustrates a simplified diagram of a radar system 100 with non-"$\lambda/2$-based spacing" (sparse or unequal) spacing between one or more physical antenna elements. As shown in FIG. 1A, in this embodiment there are two physical transmit antennas Tx1 105a and Tx2 105b that each transmit signals at a wavelength $\lambda$ and that are separated by d4. There are also four physical receive antennas where Rx1 110a is separated from Rx2 110b by d1, Rx3 110c separated from Rx2 by d2 and Rx4 110d is separated from Rx3 by d3. Distributed antenna arrays having non-"$\lambda/2$-based spacing" (e.g., sparsity, irregular or inconsistent spacing) can be used on the physical transmitter antennas 105, the physical receiver antennas 110 or both.

More specifically, in a traditional radar system that has "$\lambda/2$-based spacing" for example, d1=$\lambda/2$, d2=$\lambda/2$, d3=$\lambda/2$ and d4=2$\lambda$ such that each virtual antenna of the resulting virtual antenna array is spaced apart at consistent $\lambda/2$ intervals. In contrast, in one example embodiment in which the physical receiver antennas 105 have non-"$\lambda/2$-based spacing", d1=$\lambda/2$, d2=$\lambda$, d3=$\lambda/2$ and d4=2$\lambda$ while in other example embodiment the physical transmitter antennas 105 may have non-"$\lambda/2$-based spacing", for example, d4=4$\lambda$ when d1 through d3=2/$\lambda$. In this embodiment the non-"$\lambda/2$-based spacing" of the physical transmit 105 and/or receive 110 antennas results in a virtual antenna array having one or more "gaps" (a space between adjacent virtual antennas that is an integer multiple of $\lambda/2$ where the integer is greater than 1). In some embodiments one or more of d1-d4 is an integer multiple of $\lambda/2$ including the integers 2, 3, 4, 5, etc. and may exclude the integer 1.

Each physical transmit and receive antenna, 105, 110, respectively, is connected to a processor 120 that controls each antenna and may more specifically control the transmission operations of the transmit antennas and the received data from the receive antennas. Processor 120 may be any suitable processing system including but not limited to a radio frequency (RF) system-on-chip (SOC), a local and/or remote computing system or a combination of computing systems. Although radar system 100 depicts six physical antennas with a particular spacing (e.g., d1-d4) between each antenna, one of skill in the art having the benefit of this disclosure will appreciate that this invention is not limited to this embodiment and that any suitable number of physical transmit and receive antennas can be used and the spacing between may be any suitable distance.

Figure 1B:
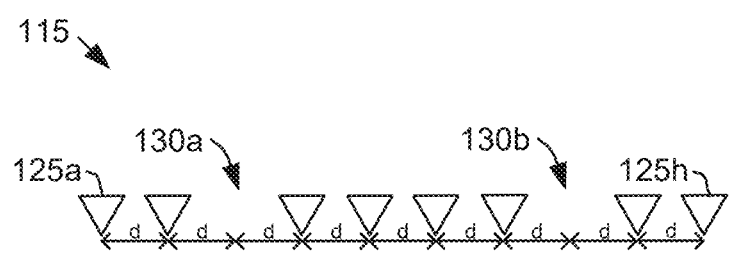
FIG. 1B is an illustration of an example array of "virtual" antennas that can be created via physical antennas and a processor according to some aspects of the present disclosure.

FIG. 1B illustrates an example virtual antenna array 115 that can be created from a combination of the physical transmit antennas 105 and the physical receive antennas 110 via digital signal processing performed by the processor 120 shown in FIG. 1A in its general form. When multiple physical transmit and receive antennas are co-located, they can act together to form what is commonly known as a virtual antenna array 115. The virtual antenna array 115 is not a set of physical antennas, rather it is a mathematically equivalent construct that describes the behavior of the antenna array. The number of virtual elements in a traditional planar virtual antenna array having "N" physical transmit antennas and "M" physical receive antennas is the product of N and M, however if any of the physical antennas have non-"$\lambda/2$-based spacing" the number of antenna positions (all having $\lambda/2$-based spacing) in the virtual array may be greater than the product of N and M, as described in more detail below As shown in FIG. 1B radar system 100 may employ digital signal processing to create the virtual antenna array 115 of eight virtual receive antennas (125a-125h) from the signals sent to and/or received from the two physical transmit antennas Tx1 105a, Tx2 105b and the four physical receive antennas Rx1 110a, Rx2 110b, Rx3 110c, Rx4 110d. As further shown in FIG. 1B, one or more missing virtual antennas 130a, 130b may form "gaps" (spaces between adjacent virtual antennas that are greater than $\lambda/2$, in this case $\lambda$) in the virtual antenna array 115 and thus the virtual antenna array may not have uniform phase consistency. The combination of the virtual antennas 125a-125h and the missing virtual antennas 130a-130b each have a consistent defined distance "d" between them where d=$\lambda/2$. The virtual antenna array 115 has e.g., sparsity, irregular or inconsistent spacing between virtual antennas 125a because of the missing virtual antennas 130 (e.g., antennas that are missing at $\lambda/2$ spacing). For example, the space between virtual antenna 125a and 125b is d ($\lambda/2$) whereas the space between virtual antenna 125b and 125c is 2d($\lambda$). In some embodiments the one or more missing virtual antennas 130 may be generated when one or more of the physical transmit and/or receive antennas have non-"$\lambda/2$-based spacing".

Figure 1C:
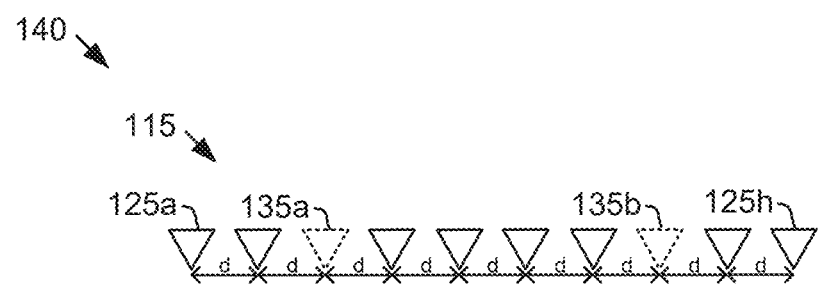
FIG. 1C is an illustration of an example array of "virtual" antennas with gaps filled in with virtual antenna elements, according to some aspects of the present disclosure.

FIG. 1C illustrates the example virtual antenna array 115 shown in FIG. 1B, with missing virtual antennas 130a-130b filled in with supplemental virtual antennas 135a-135b forming a supplemented virtual antenna array 140. The supplemented virtual antenna array 140 includes ten virtual antenna elements regularly spaced at a distance d (where d=$\lambda/2$), providing a virtual array of antennas with uniform angular resolution and phase consistency. More specifically, processor 120 (see FIG. 1A) may employ a neural network, machine learning process or other suitable algorithm to generate data for each supplemental virtual antenna 135 such that processor 120 can detect objects uniformly across all 10 antenna elements. Processor 120 may use data from the physical transmit antennas 105 (see FIG. 1A) and the physical receive antennas 110 to generate data for the supplemental virtual antennas 135. As shown in FIG. 1C, the number of virtual antennas for the supplemented virtual array 140 is the product of M and N (two times four) plus the number of supplemental virtual antennas (in this case there are two) so in this example there are ten virtual antennas. As appreciated by a person of ordinary skill in the art having the benefit of this disclosure processor 120 may include one or more processors that work in conjunction with each other. In one example embodiment a first processor is an RF ASIC that communicates with the physical antennas, a second process is used for data transfer and a third processor is used for the neural network processing.

The neural network can be trained based on a machine learning model, including Deep Neural Networks (DNN), convolutional neural network (CNN) or any other suitable type of training, some of which can be based on a neural network. In some embodiments the neural network may undergo training to understand patterns and correlations within the available radar data, enabling the network to estimate the signals for the supplemental virtual antennas 135 that are missing in the virtual array and send corresponding data to processor 120. In some embodiments the neural network can produce data for supplemental antennas 135 while in further embodiments the neural network can additionally produce data for each virtual antenna 125 so the processor produces data for each antenna of the supplemented virtual antenna array 140. In various embodiments the neural network may be integrated into processor 120 and/or may form a portion of a system-on-a-chip. In some embodiments d, which is a spacing between each element of the supplemented virtual array 115, is $\lambda/2$.

In some embodiments transmit antennas 105 may be arranged in a two-dimensional array providing the radar system 100 with a two-dimensional virtual antenna that provides data for both azimuth and elevation dimensions. For example, radar system 100 may use a transmit antenna array similar to transmit antenna 1105 shown in FIG. 11 and described in greater detail below.

Figure 2:
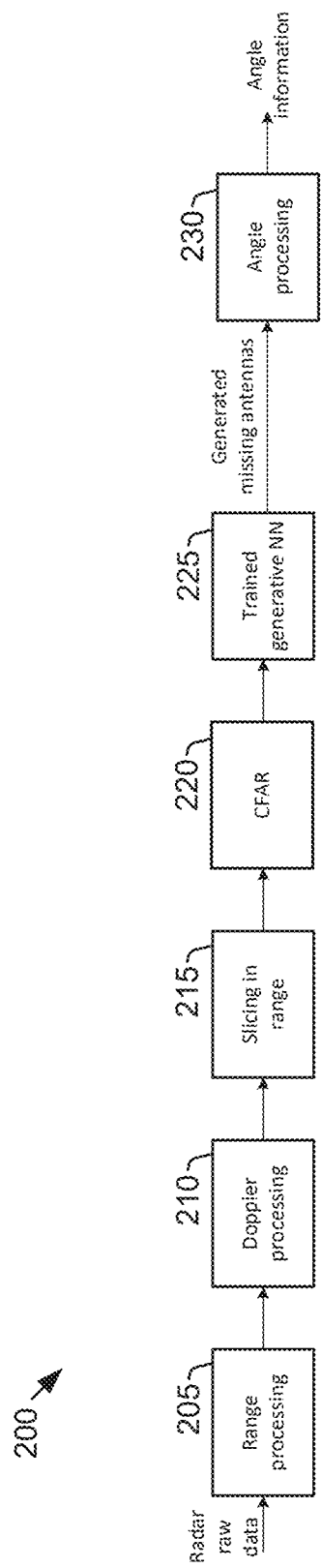
FIG. 2 is an example block diagram of how a radar system may work, according to embodiments of the present disclosure.

FIG. 2 is an example block diagram of how radar system 100 shown in FIG. 1A may work, according to embodiments of the disclosure. As shown in FIG. 2, raw data from the radar array (e.g., from processor 120, receive antennas 110 and/or transmit antennas 105) enters range processing 205 where ranges of the targets are processed. Data is transferred from range processing to a doppler processing 210 before slicing 215 takes place. The sliced data is transferred to a Constant False Alarm Rate (CFAR) processing 220 which may be used to detect target returns against a background of noise, clutter, and interference. The results of the CFAR analysis may then be used to generate supplemental virtual antenna elements 135 (see FIG. 1C) via a trained generative neural network 225. Data from the supplemental virtual antenna elements 135 (see FIG. 1C), from the virtual antenna elements 125 (see FIG. 1C) and optionally from the physical antenna elements 105, 110 (see FIG. 1A) is transferred to angle processing 230, from which angle information is derived.

Figure 3:
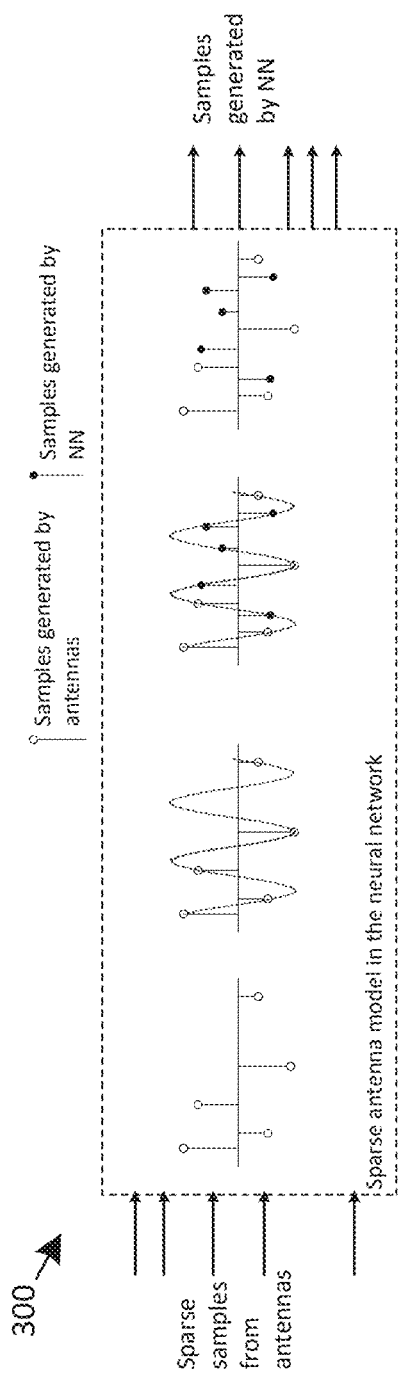
FIG. 3 is an illustration of a simplified model of one embodiment of a generation of antennas inside a neural network model, according to some aspects of the present disclosure.

FIG. 3 illustrates a simplified model 300 of one embodiment of the generation of a supplemental virtual antennas using a neural network model. This generator network may be responsible for generating data for the missing virtual antennas (e.g., supplemental virtual antennas). The training process allows the generator to improve over time and produce more realistic samples. As shown in FIG. 3 the sparse input signal may be part of a sampled continuous signal. Note that the samples are defined in a space dimension, which are the data received from antennas. The generated samples by the neural network correspond to the signals of the missing antennas in angle domain of the radar. These signals can be alternatively used along with the signals from original receivers for angle processing. Angle processing data may be used to generate angle information for the object(s).

The integration of a neural network with sparse antennas may be used to transform the radar system from a discrete-time low-resolution signal to a high-resolution signal within the network architecture. In some embodiments the network may be based on a Tensorflow Processing Units (TPU) or other suitable approach that utilizes distributed antennas in conjunction with the neural network.

Figure 4:
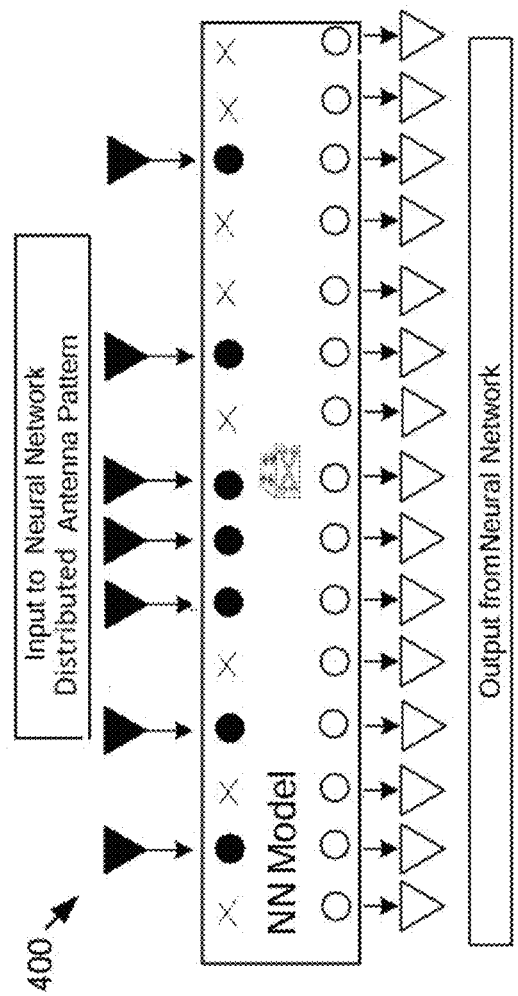
FIG. 4 is an illustration of a high-level depiction of a machine learning-based neural network model, according to embodiments of the present disclosure.

FIG. 4 illustrates a high-level depiction of a machine learning-based neural network model 400, according to embodiments of the invention. As shown in FIG. 4, the neural network can be used to generate the data for supplemental antennas using the trained model and may be based on the locations of the antennas. In some embodiments the system may generate supplemental antenna elements.

As appreciated by one of ordinary skill in the art having the benefit of this disclosure, in some embodiments, when the field of view of the system is greater than or less than 180 degrees, the optimal spacing between each antenna of the supplemented virtual array 140 may be greater than or less than $\lambda/2$ and may be referred to more generally as a "predetermined distance". For example, in one embodiment a desired field of view of the supplemented virtual array 140 is 120 degrees and therefore the optimal predetermined distance between each antenna of the supplemented virtual antenna array is $\lambda/3$. In various embodiments the predetermined distance may be $\lambda/2$ while in other embodiments the predetermined distance may be greater or less than $\lambda/2$.

Figure 5:
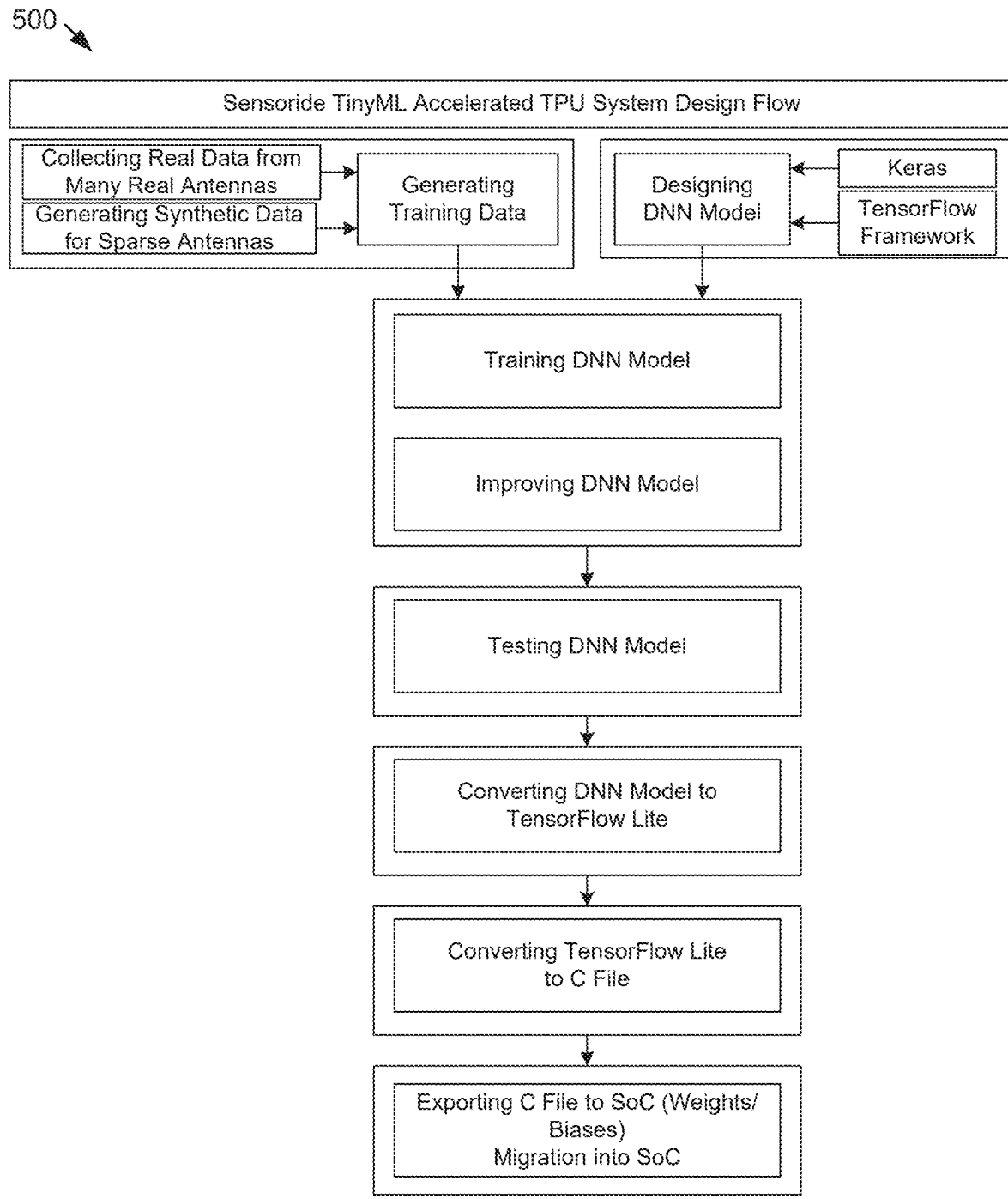
FIG. 5 is an illustration of example steps associated with training a machine learning model, according to embodiments of the present disclosure.

FIG. 5 illustrates example steps associated with a method of training a machine learning model 500, according to embodiments of the disclosure. As shown in FIG. 5, the training may apply in the angle domain if the focus is on improved angular resolution, however, other embodiments may employ different suitable training algorithms. In some embodiments, the deep learning network, or any other suitable neural network model, is capable of learning and capturing patterns within the underlying data. In one example a dataset comprising 10,000 instances is generated, e.g., test scenarios, that represent typical test scenarios. This dataset may consist of both real and imaginary data, enabling the deep learning network to learn and model the patterns effectively.

Datasets may be divided into three subsets: training, validation, and test. The division may be used to assess the accuracy of the trained model by comparing its predictions to actual data and determining the level of agreement between them. In order to have data available for evaluation, a portion of the dataset may be set aside before the training process begins. In one example 20% of the data is reserved for validation, 20% is used for testing, and the remainder of 60% is used to train the model.

A person of skill in the art, with the benefit of this disclosure, will appreciate that, in other embodiments, the machine learning model 500 may have variations, modifications and alternatives that are within the scope of this disclosure. For example, the machine learning model 500 describes several functions including DNN, TinyML Keras, Tensorflow, however this disclosure is not limited to these disclosed functions and other suitable functions can be used in addition to or in place of the disclosed function. In one example, a CNN model may be used in place of the DNN model. Further, the order of the steps disclosed in the machine learning model 500 may be changed.

Figure 6:
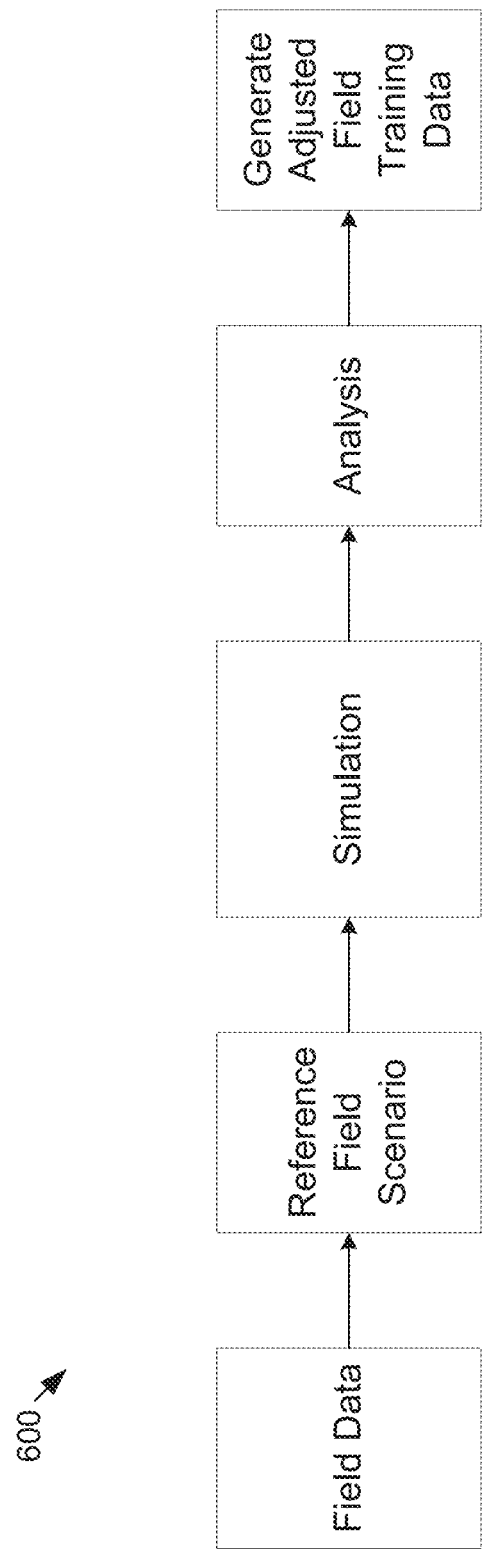
FIG. 6 is a flow chart for a simplified example process for generating training data for a machine learning model, according to embodiments of the present disclosure.

FIG. 6 illustrates an example of a simplified process 600 for generating training data for the machine learning model, according to embodiments of the disclosure. Other suitable training processes may be used. As shown in FIG. 6, real-world field data may be used to train the model. The data used for training the neural networks may include three types of radar input, which are outlined below:

Theoretical data: Preliminary radar data, typically system generated and used in simulations for algorithm development.

Real-world field data: Radar data gathered from selected scenarios (e.g., a pedestrian).

Hybrid data: Creating numerous synthetic scenarios using a subset of real-world measurements that effectively replicate hundreds of challenging scenarios of interest.

A training data set may be created from using the real-world field data as a baseline and then adjustments can be made to the phase, amplitude, and duplications, including normalization. The model's ability to effectively learn from the data and achieve accurate detection performance in radar applications is evaluated during the training. This evaluation may be carried out by calculating, for example, both a loss metric and an error metric:

Loss Metric: This is the output of the loss function which may be mean squared error, which is expressed as a positive number. Generally, the smaller the loss value, the better.

Mean Absolute Error (MAE) Metric: This is the mean absolute error of the training data. It shows the average difference between the network's output regression and the expected values from the training data.

The trained model may utilize signals from the physical sparse antennas as input and generate a set of additional and new virtual antennas as output. This specific problem falls under the category of regression, where the model aims to predict continuous phase values based on the given input. To develop the model, any suitable neural network architecture may be used that consists of layers of interconnected neurons that aim to learn patterns and relationships within the training radar data to make accurate estimations.

Figure 7:
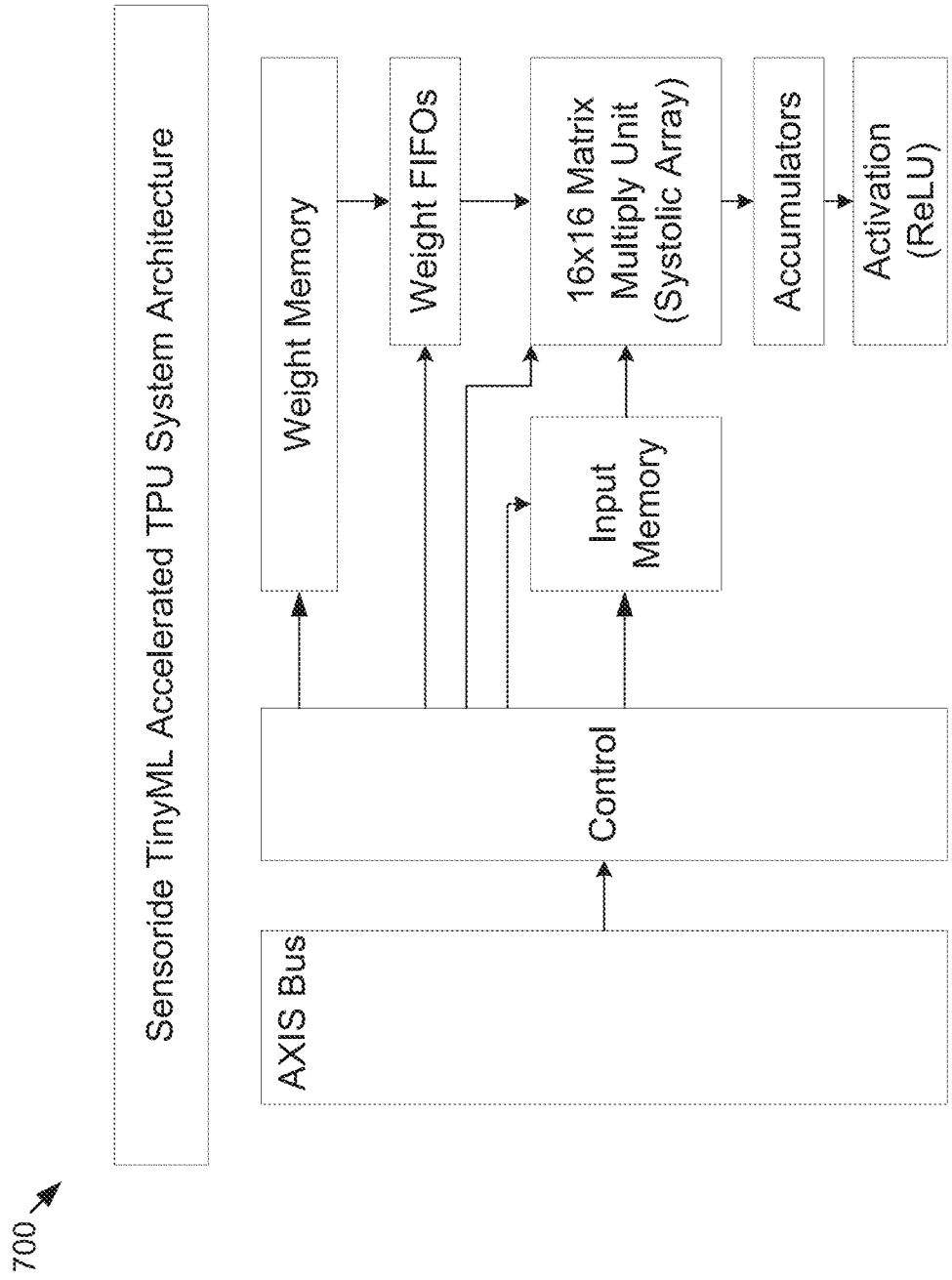
FIG. 7 is an illustration of an architecture for integrating a generated model into a hardware-accelerated architecture based on a Field Programmable Gate Array (FPGA) according to some aspects of the present disclosure.

FIG. 7 illustrates an architecture 700 of integrating the generated model into a hardware-accelerated architecture based on a FPGA. As shown in FIG. 7, the commands and data are transferred through the PS interface using the AXIS bus. Upon reception, these commands are decoded and directed to one of the following functions:

Write Weight Memory: Data on the bus is written into a specific location in Weight Memory space.

Write Input Memory: Data on the bus is written onto a specified location in Input Memory space.

Fill Weight FIFO's: A set of weights is read from weight memory into the weight FIFO's.

Drain Weight FIFO's: A set of weights currently held in the weight FIFOs is loaded into the systolic array.

Matrix Multiply: A set of inputs is piped into the systolic array and multiplied with the set of weights currently held in the array.

Read Output Memory: A specified word from memory is read to the host.

The architecture may utilize a weight stationary systolic array, which operates by loading a set of weights once and reusing them for multiple operations. This array may be fully pipelined and can perform a 16×16 matrix multiplication in 32 cycles. The systolic array consists of multiple processing elements (PEs) that contain a small amount of memory and control logic, along with a single multiply-accumulate data path. The execution of a complete matrix multiplication starts from the top left corner of the systolic array and progresses diagonally downward in a pipelined fashion.

Figure 8:
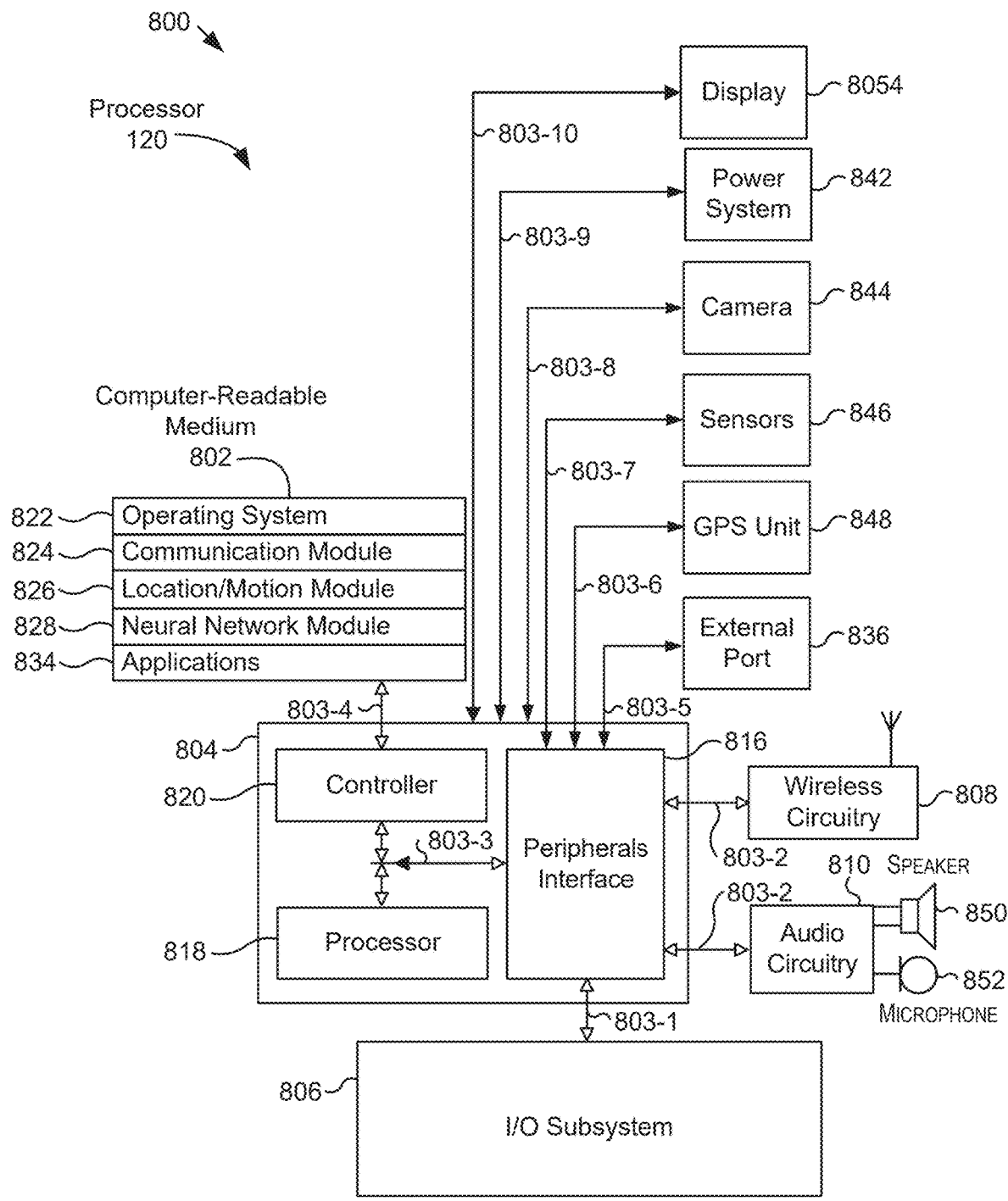
FIG. 8 is a block diagram of an example processor that may be used to operate a radar system having an array of physical antennas to generate an array of virtual antennas with generated antennas to fill gaps within the array of virtual antennas, according to embodiments of the present disclosure.

FIG. 8 is a block diagram 800 of an example processor 120 (see FIG. 1A) that may be used to operate a radar system having an array of physical antennas to generate an array of virtual antennas with continuous phase, according to embodiments of the disclosure. Processor 120 may be one or more semiconductor devices including but not limited to a system on a chip (SOC), a multi-chip module, a field programmable gate array (FPGA) or other suitable device. In some embodiments, processor 120 may include a computer-readable medium (memory) 802, a processing system 804, an Input/Output (I/O) subsystem 806, wireless circuitry 808, and audio circuitry 810 including speaker 850 and microphone 852. These components may be coupled by one or more communication buses or signal lines 803. Processor 120 can encompass any suitable processing device and/or portable electronic device, including a handheld computer, a tablet computer, a remote control unit for a drone, a mobile phone, laptop computer, tablet device, media player, a wearable device, personal digital assistant (PDA), a multi-function device, a mobile phone, a portable gaming device, a car display unit, or the like, including a combination of two or more of these items.

The processor 120 can be a system on chip (SOC) which may be an RF device with an embedded processor or can be any other suitable processor in accordance with some embodiments. The touch screen optionally displays one or more graphics within user interface (UI). In some embodiments, a user is enabled to select one or more of the graphics by making a gesture on the graphics, for example, with one or more fingers or one or more styluses. In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with processor 120. In some implementations or circumstances, inadvertent contact with a graphic does not select the graphic. For example, a swipe gesture that sweeps over an application icon optionally does not select the corresponding application when the gesture corresponding to selection is a tap. Processor 120 can optionally also include one or more physical buttons, such as "home" or menu button. As menu button is, optionally, used to navigate to any application in a set of applications that are, optionally, executed on the processor 120. Alternatively, in some embodiments, the menu button is implemented as a soft key in a graphical user interface displayed on touch screen.

The processor 120 can incorporate a display 854. The display 854 can be a LCD, OLED, AMOLED, Super AMOLED, TFT, IPS, or TFT-LCD that typically can be found a computing device. The display 854 may be a touch screen display of a computing device.

In one embodiment, processor 120 includes touch screen, menu button, push button for powering the device on/off and locking the device, volume adjustment button(s), Subscriber Identity Module (SIM) card slot, head set jack, and docking/charging external port. Push button is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, processor 120 also accepts verbal input for activation or deactivation of some functions through microphone. Processor 120 also, optionally, includes one or more contact intensity sensors for detecting intensity of contacts on touch screen and/or one or more tactile output generators for generating tactile outputs for a user of processor 120.

In one illustrative configuration, processor 120 may include at least one computer-readable medium (memory) 802 and one or more processing units (or processor(s)) 818. Processor(s) 818 may be implemented as appropriate in hardware, software, or combinations thereof. Computer-executable instruction or firmware implementations of processor(s) 818 may include computer-executable instructions written in any suitable programming language to perform the various functions described.

Computer-readable medium (memory) 802 may store program instructions that are loadable and executable on processor(s) 818, as well as data generated during the execution of these programs. Depending on the configuration and type of processor 120, memory 802 may be volatile (such as random access memory (RAM)) and/or non-volatile (such as read-only memory (ROM), flash memory, etc.). Processor 120 can have one or more memories. Processor 120 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the devices. In some implementations, memory 802 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

Memory 802 and additional storage, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. Memory 802 and additional storage are both examples of non-transitory computer storage media. Additional types of computer storage media that may be present in processor 120 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by processor 120. Combinations of any of the above should also be included within the scope of non-transitory computer-readable storage media. Based on the disclosure and teachings provided herein, a person of ordinary skill in the art can appreciate other ways and/or methods to implement the various embodiments. However, as noted above, computer-readable storage media does not include transitory media such as carrier waves or the like.

Alternatively, computer-readable communication media may include computer-readable instructions, program modules, or other data transmitted within a data signal, such as a carrier wave, or other transmission. However, as used herein, computer-readable storage media does not include computer-readable communication media.

Processor 120 may also contain communications connection(s) 808 that allow processor 120 to communicate with a data store, another device or server, user terminals and/or other devices via one or more networks. Such networks may include any one or a combination of many different types of networks, such as cable networks, the Internet, wireless networks, cellular networks, satellite networks, other private and/or public networks, or any combination thereof. Processor 120 may also include I/O device(s) 806, such as a touch input device, a keyboard, a mouse, a pen, a voice input device, a display, a speaker, a printer, etc.

It should be apparent that the architecture shown in FIG. 8 is only one example of an architecture for processor 120, and that processor 120 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 808 can use various protocols, e.g., as described herein. For example, wireless circuitry 808 can have one component for one wireless protocol (e.g., Bluetooth®) and a separate component for another wireless protocol (e.g., UWB). Different antennas can be used for the different protocols.

Wireless circuitry 808 is coupled to processing system 804 via peripherals interface 816. Interface 816 can include conventional components for establishing and maintaining communication between peripherals and processing system 804. Voice and data information received by wireless circuitry 808 (e.g., in speech recognition or voice command applications) is sent to one or more processors 818 via peripherals interface 816. One or more processors 818 are configurable to process various data formats for one or more application programs 834 stored on computer-readable medium (memory) 802.

Peripherals interface 816 couple the input and output peripherals of the device to processor(s) 818 and computer-readable medium 802. One or more processors 818 communicate with computer-readable medium 802 via a controller 820. Computer-readable medium 802 can be any device or medium that can store code and/or data for use by one or more processors 818. Medium 802 can include a memory hierarchy, including cache, main memory, and secondary memory.

Processor 120 also includes a power system 842 for powering the various hardware components. Power system 842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management, and distribution of power in mobile devices.

In some embodiments, processor 120 includes a camera 844. In some embodiments, processor 120 includes sensors 846. Sensors 846 can include accelerometers, compasses, gyrometers, pressure sensors, audio sensors, light sensors, barometers, and the like. Sensors 846 can be used to sense location aspects, such as auditory or light signatures of a location.

In some embodiments, processor 120 can include a GPS receiver, sometimes referred to as a GPS unit 848. A mobile device can use a satellite navigation system, such as the Global Positioning System (GPS), to obtain position information, timing information, altitude, or other navigation information, including for one or more objects detected by the radar system. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for processor 120. In some embodiments, the software components include an operating system 822, a communication module (or set of instructions) 824, a location module (or set of instructions) 826, a bounding path 828 that is used as part of ranging operation described herein, and other applications (or set of instructions) 834.

Operating system 822 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components. An operating system 822 is system software that manages computer hardware and software resources and provides common services for computer programs. For example, the operating system 822 can manage the interaction between the user interface module and one or more user application(s). The various embodiments further can be implemented in a wide variety of operating environments, which in some cases can include one or more user computers, devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Communication module 824 facilitates communication with other devices over one or more external ports 836 or via wireless circuitry 808 and includes various software components for handling data received from wireless circuitry 808 and/or external port 836. External port 836 (e.g., USB, FireWire, Lightning connector, 60-pin connector, etc.) is adapted for coupling directly to other devices or indirectly over a network (e.g., the Internet, wireless LAN, etc.).

Location/motion module 826 can assist in determining the current position (e.g., coordinates or other geographic location identifiers) and motion of processor 120 and/or one or more object detected by the radar system. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for processor 120 based on the position coordinates of the corresponding transmitters. Regardless of the specific location technology used, location/motion module 826 receives information from which a location fix can be derived, interprets that information, and returns location information, such as geographic coordinates, latitude/longitude, or other location fix data.

The neural network module 828 can be employed with sparse antennas and used to generate a new radar data with continuous phase from a discrete-time physically sparse signal configuration within the network architecture. In some embodiments the network may be based on a Tensorflow Processing Units (TPU) approach that utilizes sparse antennas in conjunction with the neural network. The neural network can be trained based on machine learning model based on perception, including Deep Neural Networks (DNN) and convolutional neural network (CNN). In some embodiments the neural network may undergo training to understand patterns and correlations within the available radar data, enabling the network to estimate the signals for the generated virtual antennas.

The one or more applications programs 834 on the mobile device can include any applications installed on the processor 120, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating, and displaying graphical objects (including without limitation text, web pages, icons, digital images, animations and the like) on a display surface. In another example, a timer module can be a software timer. The timer module can also be implemented in hardware. The timer module can maintain various timers for any number of events.

The I/O subsystem 806 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or track pad. In some embodiments, I/O subsystem 806 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, processor 120 can include a touchpad (not shown)

for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art can appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically can include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other devices such as network input/output devices may be employed.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid state drive, a hard drive, a CD, or an entire computer system), and may be present on or within different computer products within a system or network. A computer system may include a monitor, printer, or other suitable display for providing any of the results mentioned herein to a user.

Figure 9:
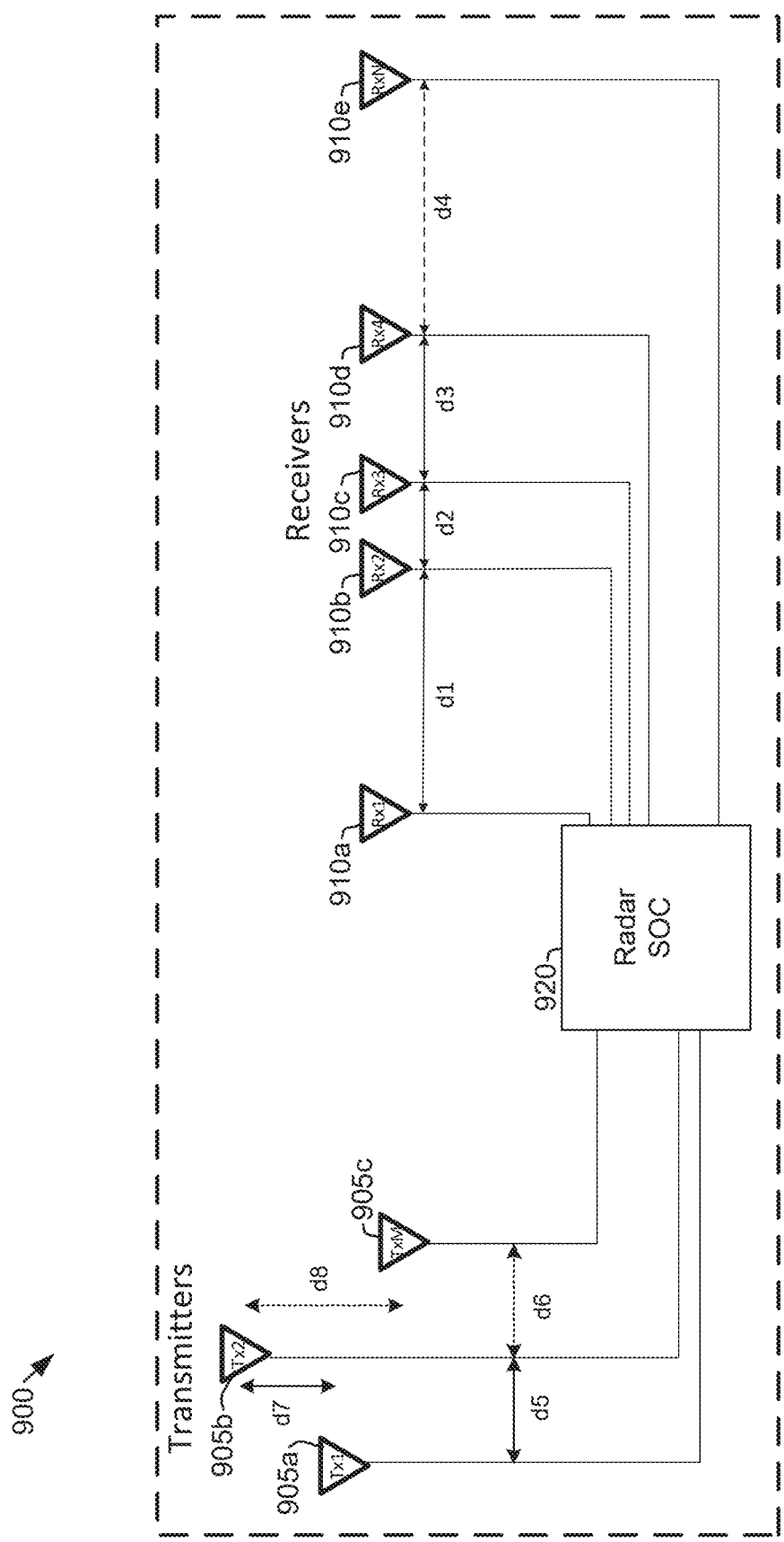
FIG. 9 is a simplified diagram of a radar system with non-standard (sparse, uniform or non-uniform) spacing between physical antenna elements, according to some aspects of the present disclosure.

FIG. 9 is a simplified diagram of a physical radar system 900 having non-$\lambda/2$ spacing between one or more physical transmit and/or one or more receive antennas, according to some aspects of the present disclosure. Radar system 900 may be or include any of the components, features, or characteristics of any of the radar systems previously described in the present disclosure. More specifically, physical radar system 900 may be used in radar system 100 to provide both azimuth and elevation data. As shown in FIG. 9, the radar system 900 includes three physical transmit antennas 905 where Tx1 905a and Tx2 905b are separated in a horizontal direction by d5 and separated in a vertical direction by d7 and where Tx2 905b and Tx3 905c are separated in the horizontal direction by d6 and in the vertical direction by d8. In some embodiments at least one of distances d1-d8 are not equal to $\lambda/2$ (e.g., may be an integer multiple of $\lambda/2$ where the integer is not 1). The third physical transmit antenna TxM 905c indicates that the radar system can include M total physical transmit antennas. While M is three in FIG. 9, M can have any suitable value.

Additionally, the radar system 900 depicted in FIG. 9 includes five physical receive antennas where Rx1 910a is separated from Rx2 910b by d1, Rx3 910c separated from Rx2 910b by d2 and Rx4 910d is separated from Rx3 910c by d3. The fifth physical receive antenna RxN 910e is separated from Rx 4 910d by d4 and indicates that the radar system can include N total physical receive antennas. While N is five in FIG. 9, N can be any suitable value, including M. In some embodiments at least one of d1-d4 are not equal to $\lambda/2$.

In some embodiments d5 and d6 are related to d1-d4. For example, in one embodiment d1-d6 have similar distances, e.g., $2\lambda/2$. In another embodiment d1-d8 have similar distances, e.g., $3\lambda/2$. In further embodiments only one of d1-d8 may not be $\lambda/2$. These and other permutations are within the scope of this disclosure, some of which are described in more detail below.

In general, spacings between physical receive antennas 910 of the radar system 900 can be defined as $d_i$ and spacings between the physical transmit antennas 905 can be defined as $d_j$. Each of the physical receive antenna spacings can be described by an expression $d_i = a_i(\lambda/2)$, whereas the physical transmit antenna spacing components can be defined in a similar manner: $d_k = b_k(\lambda/2)$ and $d_j = b_j(\lambda/2)$. The transmit antenna spacing components can be horizontal components or vertical components. The horizontal components $d_k$ can be useful for determining azimuthal angular data for an object, whereas the vertical components $d_j$ can assist in determining elevation angular data. The radar system 900 can include several types of arrangements, such as (note: this is not an exhaustive list of all permutations which are within the scope of this disclosure) where $a_i$=every nonzero integer, $b_k$=every nonzero integer and $b_j$=every nonzero integer.

Each physical transmit antenna 905 and receive antenna 910 is connected to a processor 920 that controls each antenna and may more specifically control the transmission operations of the transmit antennas and the received data from the receive antennas. The processor 920 may be or include any of the components, features, or characteristics of any of the processors previously described in the present disclosure. Processor 920 may be any suitable processing system including but not limited to a system on a chip (SOC), a local and/or remote computing system or a combination of computing systems. The processor 920 can include a machine learning model. The machine learning model can receive data from and associated with the radar system 100 to produce data for a virtual array of receive antennas all with $\lambda/2$ spacing.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A radar system comprising:
a physical antenna array comprising:
a plurality of physical transmit antennas that each transmit a respective transmit signal at a wavelength $\lambda$;
a plurality of physical receive antennas, each arranged to receive each of the respective transmit signals; and
a processor coupled to the physical antenna array and arranged to:
generate data corresponding to a virtual antenna array having a defined distance between each virtual antenna that is inconsistent; and
generate data, via a neural network, in an angle domain of the radar corresponding to one or more supplemental virtual antennas that when used in conjunction with the data corresponding to the virtual antenna array represents data for a supplemented antenna array having a defined distance between each antenna of $\lambda/2$.

2. The radar system of claim 1 wherein a first physical receive antenna of the plurality of physical receive antennas is spaced apart from a second physical receive antenna of the plurality of physical receive antennas by a distance greater than $\lambda/2$.

3. The radar system of claim 1 wherein a first physical transmit antenna of the plurality of physical transmit antennas is spaced apart from a second physical transmit antenna of the plurality of physical transmit antennas by a distance greater than $\lambda/2$.

4. The radar system of claim 1, wherein a first defined distance between a first virtual antenna and a second virtual antenna of the virtual antenna array is an integer multiple of $\lambda/2$.

5. The radar system of claim 4, wherein the generated data corresponding to one of the one or more supplemental virtual antennas is data is for a supplemental virtual antenna positioned between the first virtual antenna and the second virtual antenna of the virtual antenna array.

6. The radar system of claim 1, wherein the neural network is trained via machine learning.

7. The radar system of claim 1, wherein the virtual antenna array has a number of virtual antennas equal to a product of a number of the plurality of physical transmit antennas and a number of the plurality of physical receive antennas.

8. A radar system comprising:
a physical antenna array comprising:
a plurality of physical transmit antennas that each transmit a respective transmit signal at a wavelength $\lambda$;
a plurality of physical receive antennas, each arranged to receive each of the respective transmit signals; and
a processor coupled to the physical antenna array and arranged to:
generate data corresponding to a virtual antenna array using data from the physical antenna array;
generate data in an angle domain of the radar corresponding to one or more supplemental virtual antennas using a neural network; and
calculate angular information for an object using the generated data corresponding to the virtual antenna array and the generated data corresponding the one or more supplemental virtual antennas.

9. The radar system of claim 8, wherein the data for the virtual antenna array includes data from a plurality of virtual antennas, and wherein a defined distance between each virtual antenna is inconsistent.

10. The radar system of claim 8 wherein a first physical receive antenna of the plurality of physical receive antennas is spaced apart from a second physical receive antenna of the plurality of physical receive antennas by a distance greater than $\lambda/2$.

11. The radar system of claim 8 wherein a first physical transmit antenna of the plurality of physical transmit antennas is spaced apart from a second physical transmit antenna of the plurality of physical transmit antennas by a distance greater than $\lambda/2$.

12. The radar system of claim 8, wherein a first defined distance between a first virtual antenna and a second virtual antenna of the virtual antenna array is an integer multiple of $\lambda/2$.

13. The radar system of claim 12, wherein the data generated for one of the one or more supplemental virtual antennas is for a supplemental virtual antenna positioned between the first and the second virtual antennas of the virtual antenna array.

14. The radar system of claim 8, wherein the neural network is trained via machine learning.

15. The radar system of claim 8, wherein the virtual antenna array has a number of virtual antennas equal to a product of a number of the plurality of physical transmit antennas and a number of the plurality of physical receive antennas.

16. A method of operating a radar system, the method comprising:
generating data for a virtual antenna array using data received from a physical antenna array, wherein the physical antenna array comprises:
a plurality of physical transmit antennas that each transmit a respective transmit signal at a wavelength $\lambda$; and
a plurality of physical receive antennas, each arranged to receive each of the respective transmit signals; and
generating data in an angle domain of the radar, using a neural network, for one or more supplemental virtual antennas; and
calculating angular information for an object using the generated data for the virtual antenna array and the generated data for the one or more supplemental virtual antennas.

17. The method of claim 16, wherein the data for the virtual antenna array includes data from a plurality of virtual antennas, and wherein a defined distance between each virtual antenna is inconsistent.

18. The method of claim 16 wherein a first physical receive antenna of the plurality of physical receive antennas is spaced apart from a second physical receive antenna of the plurality of physical receive antennas by a distance greater than $\lambda/2$.

19. The method of claim 16 wherein a first physical transmit antenna of the plurality of physical transmit antennas is spaced apart from a second physical transmit antenna of the plurality of physical transmit antennas by a distance greater than $\lambda/2$.

20. The method of claim 16, wherein the neural network is trained via machine learning.

\* \* \* \* \*